(12) United States Patent
Oshiro et al.

(10) Patent No.: US 11,440,612 B2
(45) Date of Patent: Sep. 13, 2022

(54) THROTTLE GRIP DEVICE

(71) Applicants: ASAHI DENSO CO., LTD., Hamamatsu (JP); SUZUKI MOTOR CORPORATION, Hamamatsu (JP)

(72) Inventors: Yukio Oshiro, Hamamatsu (JP); Shota Miike, Hamamatsu (JP)

(73) Assignees: ASAHI DENSO CO., LTD., Shizuoka (JP); SUZUKI MOTOR CORPORATION, Shizuoka (JP)

( * ) Notice: Subject to any disclaimer, the term of this patent is extended or adjusted under 35 U.S.C. 154(b) by 177 days.

(21) Appl. No.: 16/891,811

(22) Filed: Jun. 3, 2020

(65) Prior Publication Data
US 2020/0385083 A1   Dec. 10, 2020

(30) Foreign Application Priority Data
Jun. 4, 2019 (JP) .............................. JP2019-104841

(51) Int. Cl.
*B62K 23/04* (2006.01)
*F02D 11/02* (2006.01)
*F02D 11/10* (2006.01)

(52) U.S. Cl.
CPC .............. *B62K 23/04* (2013.01); *F02D 11/02* (2013.01); *F02D 11/106* (2013.01); *F02D 2011/101* (2013.01)

(58) Field of Classification Search
CPC ....... B62K 23/04; F02D 11/02; F02D 11/106; F02D 2011/101; B63H 20/00; G05G 5/03
See application file for complete search history.

(56) References Cited

U.S. PATENT DOCUMENTS

| 10,703,432 B2* | 7/2020 | Nishi ..................... B62K 23/04 |
| 2009/0075532 A1 | 3/2009 | Oishi et al. |

(Continued)

FOREIGN PATENT DOCUMENTS

| JP | 2018-091202 A | 6/2018 |
| JP | 2019-082151 A | 5/2019 |

OTHER PUBLICATIONS

Machine translation of Japanese Patent Application Laid-Open No. 2019-82151 (P2019-82151A) May 30, 2019.*

(Continued)

*Primary Examiner* — Phutthiwat Wongwian
*Assistant Examiner* — Arnold Castro
(74) *Attorney, Agent, or Firm* — Pearne & Gordon LLP

(57) ABSTRACT

A throttle grip device includes: a throttle grip; an interlocking member including an engaged portion engaged with an engaging portion formed on the throttle grip, and rotating in conjunction with the normal rotation and the reversed rotation of the throttle grip; a first urging unit configured to urge the interlocking member toward the initial position when the throttle grip is subjected to the normal rotation; a second urging unit configured to urge the interlocking member toward the initial position when the throttle grip is subjected to the reversed rotation; a rotation angle detecting unit detecting a rotation angle of the throttle grip by detecting a rotation angle of the interlocking member; and a pressing unit pressing the engaging portion against the engaged portion by an urging force of the second urging unit when the throttle grip is in the initial position.

4 Claims, 14 Drawing Sheets

(56) References Cited

U.S. PATENT DOCUMENTS

| | | | |
|---|---|---|---|
| 2011/0132128 A1* | 6/2011 | Sato .................. | B62K 23/04 |
| | | | 74/489 |
| 2013/0255432 A1* | 10/2013 | Nomura ............... | B62K 23/04 |
| | | | 74/504 |
| 2016/0194049 A1* | 7/2016 | Jing .................. | B62K 23/04 |
| | | | 74/504 |
| 2018/0154975 A1 | 6/2018 | Oshiro | |
| 2020/0239101 A1* | 7/2020 | Oshiro ............... | B62J 45/413 |

OTHER PUBLICATIONS

Extended European Search Report issued in European Patent Application No. 20 17 8146.5 dated Oct. 26, 2020.

\* cited by examiner

THROTTLE GRIP DEVICE

CROSS-REFERENCE TO RELATED APPLICATIONS

This application is based upon and claims the benefit of priority from prior Japanese patent application No. 2019-104841, filed on Jun. 4, 2019, the entire contents of which are incorporated herein by reference.

TECHNICAL FIELD

The present invention relates to a throttle grip device configured to control an engine of a vehicle based on rotation of a throttle grip.

BACKGROUND ART

In a recent motorcycle, it is widespread that a rotation angle of a throttle grip is detected by a throttle opening sensor such as a potentiometer, and a detected value thereof is transmitted, as an electric signal, to an electronic control device or the like that is mounted on the motorcycle. The electronic control device performs a predetermined calculation based on the detected signal such that ignition timing of the engine and opening and closing of an intake valve or a throttle valve are controlled based on a result of the calculation.

For example, JP-A-2018-91202 discloses a throttle grip device which includes a constant vehicle speed holding device (auto cruise device) configured to keep a traveling speed constant. The throttle grip device controls an engine of a vehicle according to a rotation angle of a throttle grip when the throttle grip is subjected to normal rotation in a predetermined direction, and stops (cancels) vehicle speed holding control of the constant vehicle speed holding device when the throttle grip is subjected to rotation in a direction opposite to the predetermined direction.

In such a throttle grip device in related art, an engaging portion formed on the throttle grip is engaged with an engaged portion formed on an interlocking member, and the interlocking member is rotated in the same direction as that of the throttle grip in conjunction with the normal rotation and the reversed rotation of the throttle grip. Moreover, such a throttle grip device in the related art includes: a first urging unit configured to urge the interlocking member toward an initial position when the throttle grip is subjected to the normal rotation; and a second urging unit configured to urge the interlocking member toward the initial position when the throttle grip is subjected to the reversed rotation.

However, in the throttle grip device in the related art, since the engaging portion of the throttle grip is engaged with the engaged portion of the interlocking member and the interlocking member is interlocked, rattling is likely to occur between the throttle grip and the interlocking member. Moreover, although it is also conceivable to prevent the rattling through using another urging unit separate from the first urging unit and the second urging unit, the number of components is increased in this case, and a manufacturing cost is increased.

The present invention has been made in view of the above circumstances, and provides a throttle grip device which is capable of reducing the rattling between the throttle grip and the interlocking member without increasing the number of the urging units.

SUMMARY OF INVENTION

According to an aspect of the invention, there is provided a throttle grip device comprising: a throttle grip which is rotatable by a driver, and which is capable of normal rotation in a predetermined direction from an initial position and reversed rotation in a direction opposite to the predetermined direction; an interlocking member which includes an engaged portion capable of being engaged with an engaging portion formed on the throttle grip, and which is capable of rotating in conjunction with the normal rotation and the reversed rotation of the throttle grip; a case which is configured to rotatably hold the interlocking member; a first urging unit which is configured to urge the interlocking member toward the initial position when the throttle grip is subjected to the normal rotation; a second urging unit which is configured to urge the interlocking member toward the initial position when the throttle grip is subjected to the reversed rotation; and a rotation angle detecting unit which is capable of detecting a rotation angle of the throttle grip by detecting a rotation angle of the interlocking member, wherein the throttle grip device is capable of controlling an engine of a vehicle in accordance with the rotation angle of the throttle grip detected by the rotation angle detecting unit when the throttle grip is subjected to the normal rotation, and is capable of activating or deactivating a predetermined function of the vehicle when the throttle grip is subjected to the reversed rotation, and wherein the throttle grip device further comprises: a pressing unit which is capable of pressing the engaging portion against the engaged portion by an urging force of the second urging unit when the throttle grip is in the initial position.

DESCRIPTION OF EMBODIMENTS

Hereinafter, an embodiment of the present invention will be described in detail with reference to the drawings.

Figure 1:
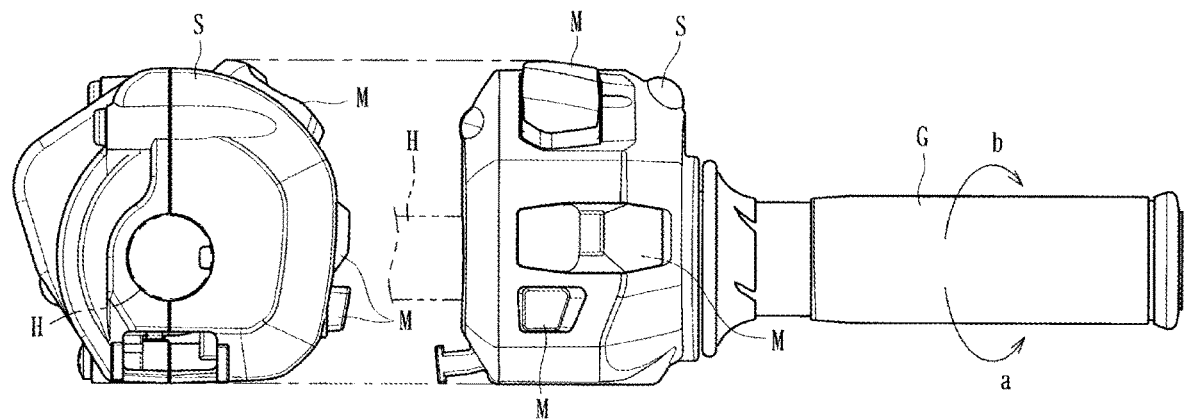
FIG. 1 includes a side view and a front view showing a throttle grip and a switch case of a vehicle to which a throttle grip device according to an embodiment of the present invention is applied.

As shown in FIG. 1, a throttle grip device according to the present embodiment is configured to detect a rotation angle of a throttle grip G attached to a handlebar H of a motorcycle, and to transmit a detected signal thereof to an electronic control device, such as an ECU, mounted on the motorcycle. As shown in FIGS. 2 to 8, the throttle grip device includes: the throttle grip G; a case 1; an interlocking member 2; an urging force applying unit 3; a first urging unit 4; a second urging unit 5; a rotating member 6; a magnetic sensor 7 (rotation angle detecting unit); and a pressing unit 10.

The case 1 is arranged in a switch case S (see FIG. 1) attached to a front end side (a base end side of the throttle grip G) of the handlebar H of the motorcycle (vehicle). The case 1 accommodates various components constituting the throttle grip device, and holds the interlocking member 2, the urging force applying unit 3, the rotating member 6 and the like in a rotatable manner A reference numeral M in FIG. 1 denotes a switch knob formed in the switch case S. A desired electric component mounted on the motorcycle may be operated by operating the desired switch knob M. A reference numeral 9 denotes a lid member configured to close an opening side of the case 1.

Figure 2:
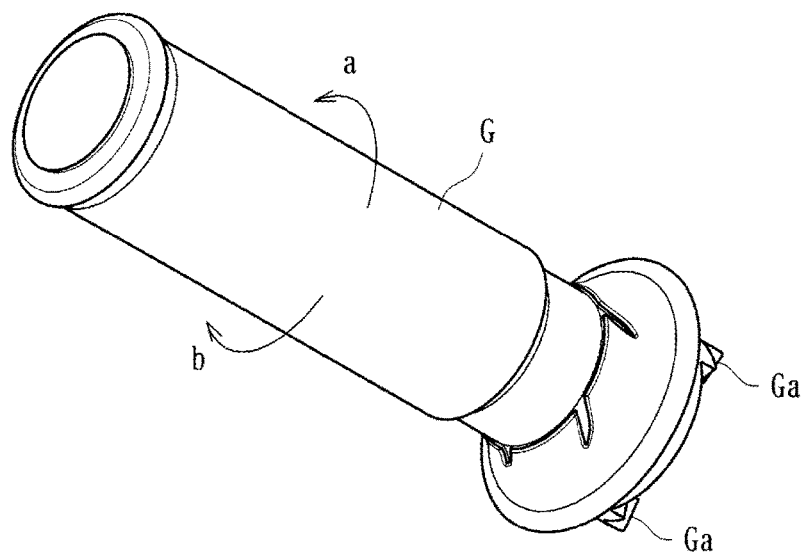
FIG. 2 is a perspective view showing a throttle grip of the throttle grip device.
Figure 3:
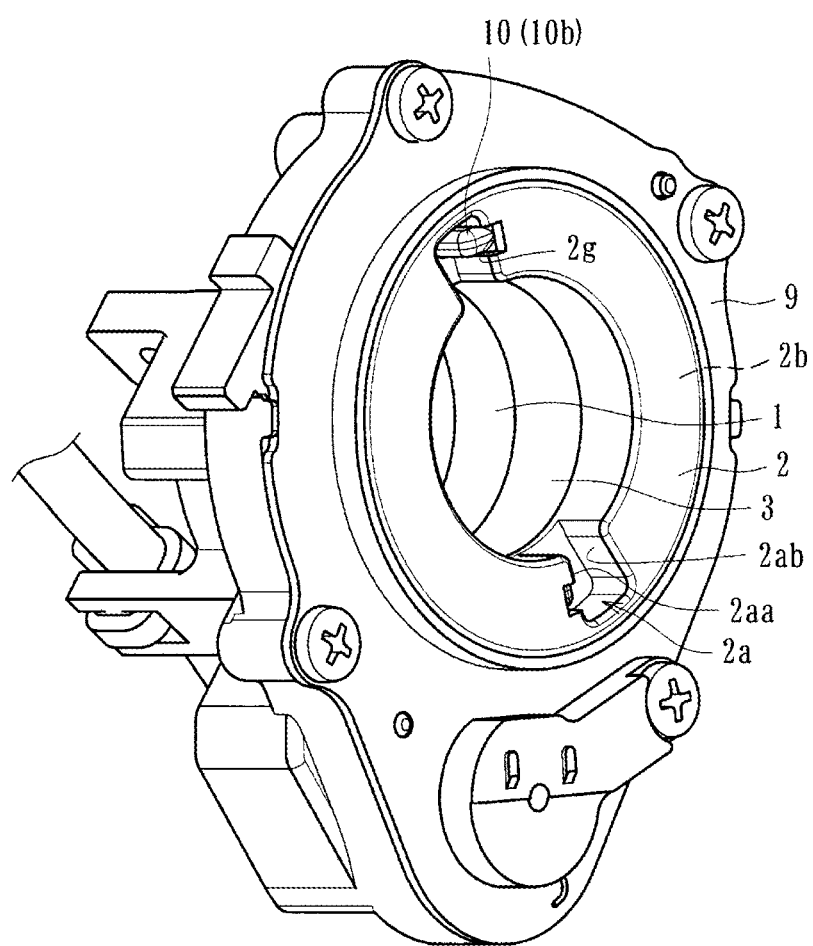
FIG. 3 is a perspective view showing the throttle grip device.
Figure 4:
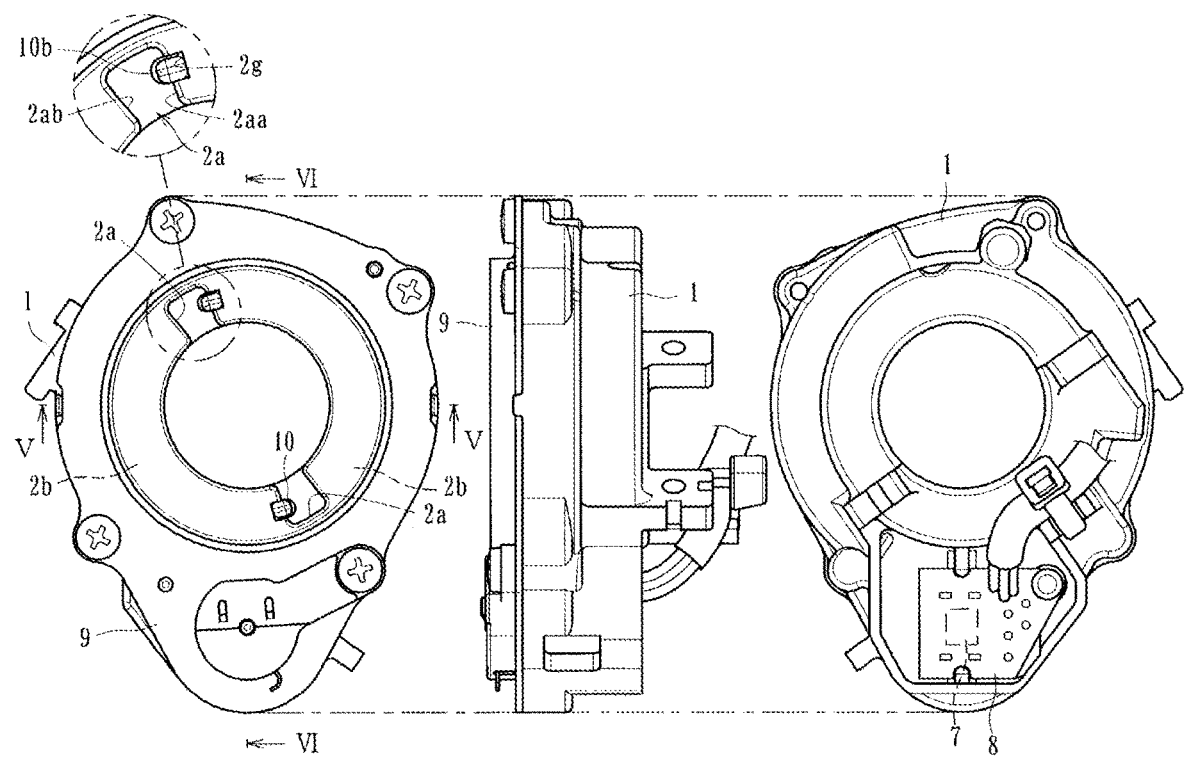
FIG. 4 is a three-sided view showing the throttle grip device.
Figure 5:
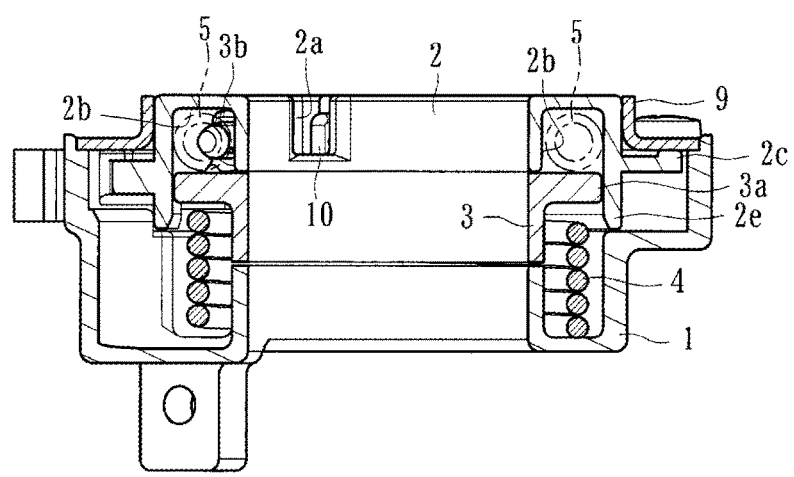
FIG. 5 is a cross-sectional view taken along line V-V of FIG. 4.

The throttle grip G extends from the switch case S and is capable of rotating while being gripped by a driver. As shown in FIGS. 1 and 2, the throttle grip G is capable of normal rotation a about a shaft thereof in a predetermined direction from an initial position and reversed rotation b in a direction opposite to the predetermined direction. Engaging portions Ga (see FIGS. 2 and 10), which are formed of a pair of protruding portions, are formed on the base end side of the throttle grip G. The throttle grip G and the interlocking member 2 are coupled to each other by engaging the engaging portions Ga with engaged portions 2a (see FIG. 2 and the like) of the interlocking member 2.

Figure 10:
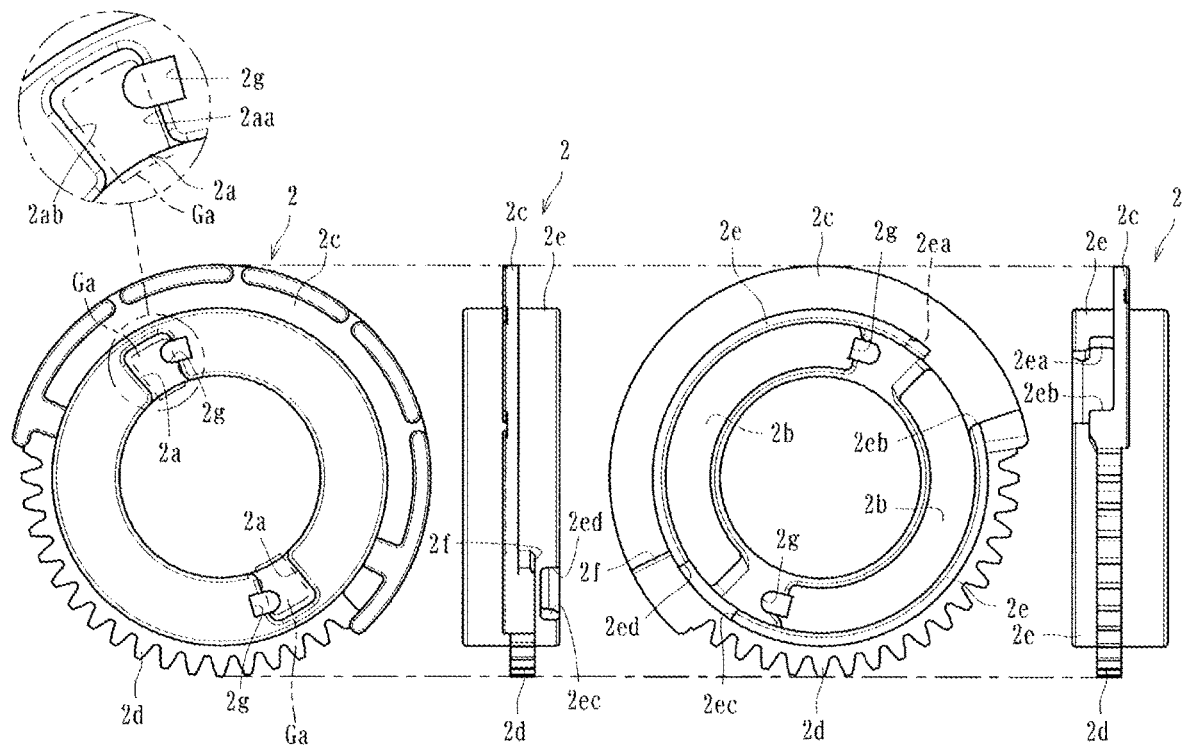
FIG. 10 is a four-sided view showing an interlocking member of the throttle grip device.

The interlocking member 2 includes the engaged portions 2a which can be engaged with the engaging portions Ga formed on the throttle grip G, and can rotate in conjunction with the normal rotation a and the reversed rotation b of the throttle grip G. Specifically, as shown in FIG. 10, the interlocking member 2 according to the present embodiment is formed of an annular member which includes: a pair of the engaged portions 2a; a pair of accommodating portions 2b; a flange 2c; and a gear 2d.

The engaged portions 2a are formed in concave shapes at positions corresponding to the engaging portions Ga of the throttle grip G, and the base end side of the throttle grip G is connected to the interlocking member 2 in a state where the engaging portions Ga are fitted into and engaged with the engaged portions 2a. As a result, the interlocking member 2 can also rotate in accordance with rotation of the throttle grip G. The engaged portions 2a are formed on a surface of the interlocking member 2 (surface on one side that can face outside when the interlocking member 2 is assembled to the case 1), and the accommodating portions 2b are formed on a surface on the other side. A pair of protruding portions 2e, which are formed in arc shapes, are formed on the surface on the other side of the interlocking member 2.

Each accommodating portion 2b is formed of a groove shape formed in an arc shape at a position between the pair of engaged portions 2a, and a compression coil spring constituting the second urging unit 5 can be accommodated therein. The flange 2c protrudes in a radial direction over an entire peripheral direction of the interlocking member 2. The gear 2d is formed over a predetermined range. The gear 2d is capable of meshing with a gear formed on an outer periphery of the rotating member 6. The rotating member 6 rotates in accordance with rotation of the interlocking member 2.

Figure 6:
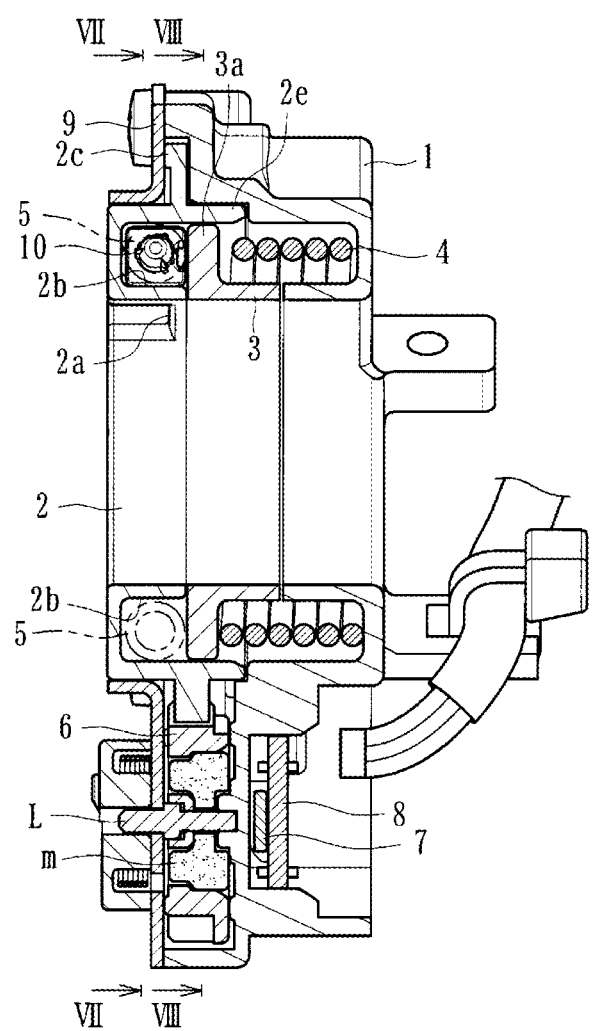
FIG. 6 is a cross-sectional view taken along line VI-VI of FIG. 4.
Figure 8:
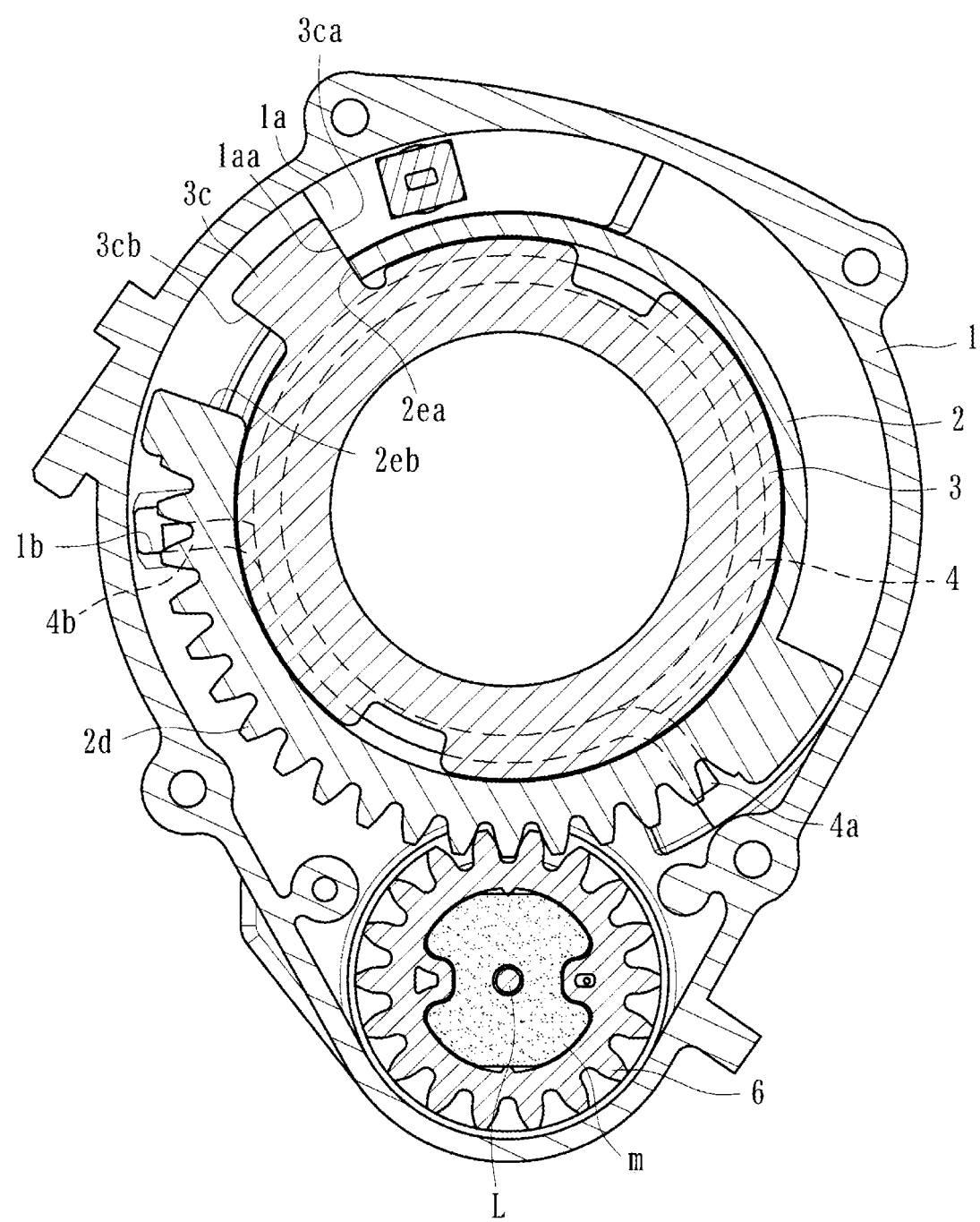
FIG. 8 is a cross-sectional view taken along line VIII-VIII of FIG. 6.

The rotating member 6, which can rotate in conjunction with the interlocking member 2 as described above, is accommodated in an accommodating recessed portion 1c (see FIG. 9) formed at a predetermined position of the case 1, and is rotatable about a shaft L (see FIGS. 6 and 8). Therefore, when the interlocking member 2 is rotated, the rotating member 6 is rotated by a rotation angle corresponding to a rotation angle of the interlocking member 2. A magnet m is attached to the rotating member 6, and a magnetic force generated from the magnet m changes in accordance with rotation of the rotating member 6.

As shown in FIG. 6, the magnetic sensor 7 (rotation angle detecting unit) is formed of a sensor that is arranged at a position on an extension line of the shaft L of the rotating member 6. The magnetic sensor 7 is capable of detecting a rotation angle of the throttle grip G by detecting a change in magnetism generated from the magnet m attached to the rotating member 6. Specifically, the magnetic sensor 7 can obtain an output voltage corresponding to a magnetic field change (change in magnetic flux density) of the magnet m. For example, the magnetic sensor 7 is configured by a Hall element (specifically, a linear Hall IC that can obtain an output voltage proportional to a magnetic field (magnetic flux density) of the magnet in), which is a magnetic sensor utilizing the Hall effect. The magnetic sensor 7 according to the present embodiment is formed on a printed circuit board 6 on which a predetermined electric circuit is printed.

Therefore, when the interlocking member 2 rotates in the same direction in accordance with the normal rotation a of the throttle grip G, the rotating member 6 also rotates in conjunction, and the magnet m attached to the rotating member 6 also rotates by the same angle in the same direction. Since the magnetic field changes in accordance with a rotation angle thereof, an output voltage corresponding to the rotation angle can be obtained, so that a rotation angle of the interlocking member 2 (that is, a rotation angle of the throttle grip G) can be detected based on the output voltage. In this way, the detected rotation angle of the throttle grip G is transmitted, as an electric signal, to an engine control unit (ECU) mounted on the motorcycle, so that an engine of the vehicle can be controlled in accordance with the transmitted rotation angle of the throttle grip G.

On the other hand, when the interlocking member rotates in the same direction in accordance with the reversed rotation b of the throttle grip G, the rotating member 6 also rotates in conjunction, and the magnet m attached to the rotating member 6 also rotates by the same angle in the same direction. As a result, since the magnetic field changes in accordance with a rotation angle thereof, an output voltage corresponding to the rotation angle can be obtained, so that the reversed rotation b of the throttle grip G can be detected.

In this way, when the reversed rotation b of the throttle grip G is detected, a predetermined function of the motorcycle can be activated or deactivated. In the present embodiment, the present invention is applied to a motorcycle equipped with a constant vehicle speed holding device (auto cruise device) configured to keep a traveling speed constant. When the throttle grip G is subjected to the reversed rotation b (rotation in a direction opposite to a direction of the normal rotation a for fully opening a throttle from an initial position), constant vehicle speed holding control can be stopped (canceled).

Therefore, the interlocking member 2 according to the present embodiment constitutes a transmission unit in which the gear 2d for transmitting a rotational force of the throttle grip G to the rotating member 6 is formed, and the second urging unit 5 is accommodated therein (in the accommodating portion 2b in the present embodiment), so that the interlocking member 2 has a function of transmitting the rotational force of the throttle grip G and a function of accommodating the second urging unit 5.

Figure 9:
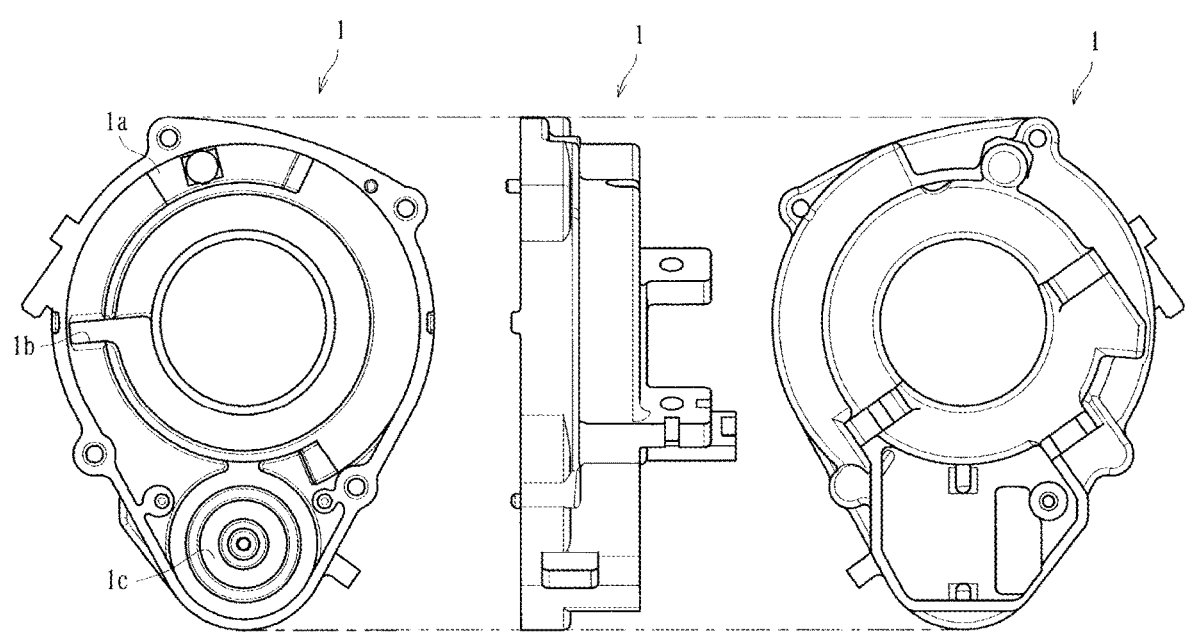
FIG. 9 is a three-sided view showing a case of the throttle grip device.
Figure 11:
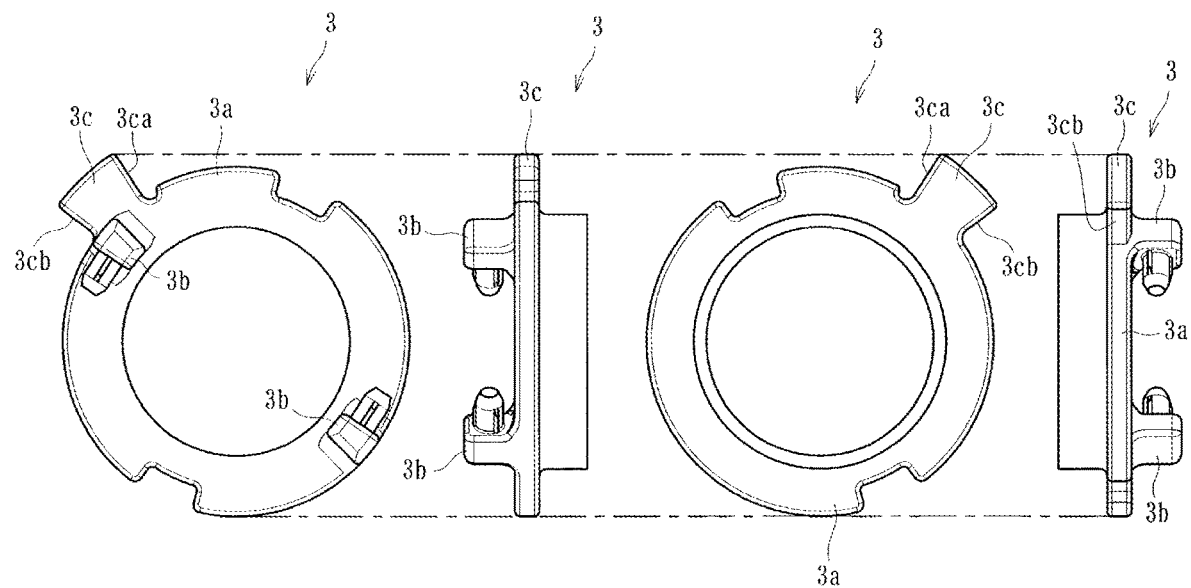
FIG. 11 is a four-sided view showing an urging force applying unit of the throttle grip device.

In the interlocking member 2 according to the present embodiment, the flange 2c whose gear 2d is formed over the predetermined range is provided. As shown in FIGS. 9 to 11, a stopper 1a and an abutting portion 3c of the urging force applying unit 3 which abuts against the stopper 1a are formed at positions corresponding to the protruding portions 2e. As a result, the stopper 1a and the abutting portion 3c can be accommodated within a diameter of the flange 2c of the interlocking member 2, which contributes to reduction in size.

The first urging unit 4 is formed of a torsion coil spring, and is configured to urge the interlocking member 2 toward an initial position when the throttle grip G is subjected to the normal rotation a. That is, when the throttle grip G is subjected to the normal rotation a, the interlocking member 2 rotates against an urging force of the first urging unit 4, so that the urging force is transmitted to the throttle grip G, and a force which returns the throttle grip G to the initial position is applied.

The second urging unit 5 is formed of a pair of coil springs, and is configured to urge the interlocking member 2 toward the initial position when the throttle grip G is subjected to the reversed rotation b. That is, when the throttle grip G is subjected to the reversed rotation b, the interlocking member 2 rotates against an urging force of the second urging unit 5, so that the urging force is transmitted to the throttle grip G, and a force which returns the throttle grip G to the initial position is applied.

The urging force applying unit 3 is attached to the second urging unit 5, and is capable of not applying the urging force of the second urging unit 5 to the interlocking member 2 when the throttle grip G is subjected to the normal rotation a (at this time, only the urging force of the first urging unit 4 is applied to the interlocking member) and applying the urging force of the second urging unit 5 to the interlocking member 2 when the throttle grip G is subjected to the reversed rotation b. Specifically, as shown in FIG. 11, the urging force applying unit 3 is formed of an annular member which includes: a pair of protruding portions 3a; a pair of spring receivers 3b configured to receive the side of one end 5a of the second urging unit 5; and the abutting portion 3c.

Figure 13A:
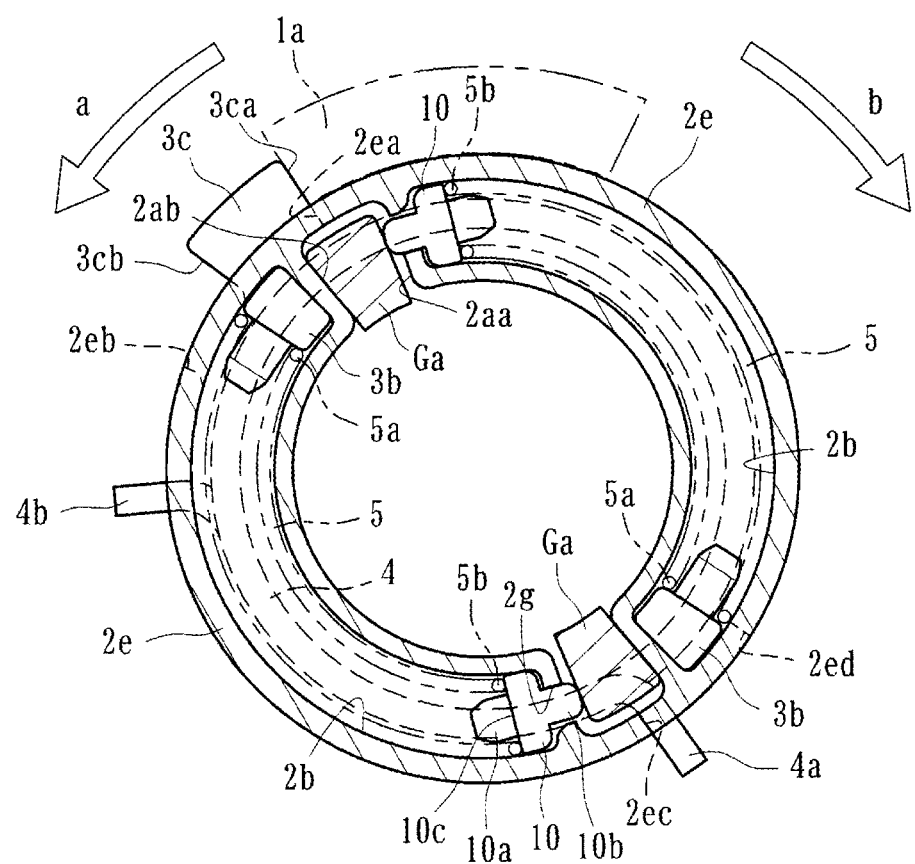
FIGS. 13A to 13C are explanatory diagrams showing an operation of the urging force applying unit of the throttle grip device, and are schematic views showing a state where the urging force applying unit and the interlocking member are in an initial position.
Figure 13B:
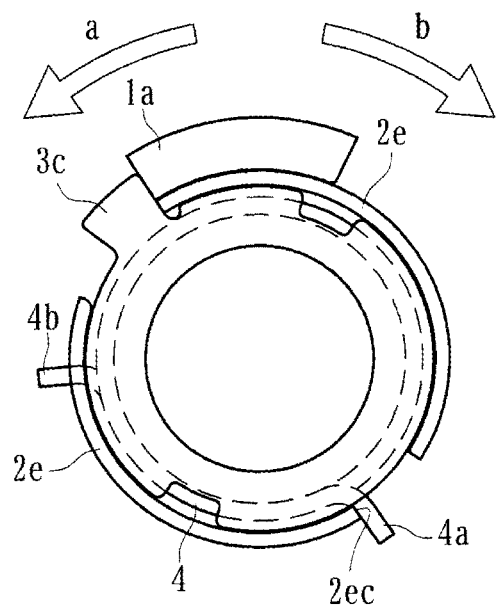
Figure 13C:
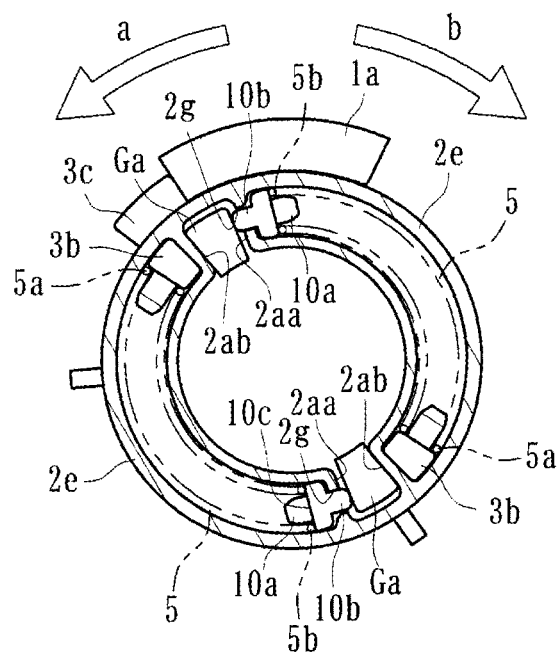
Figure 14A:
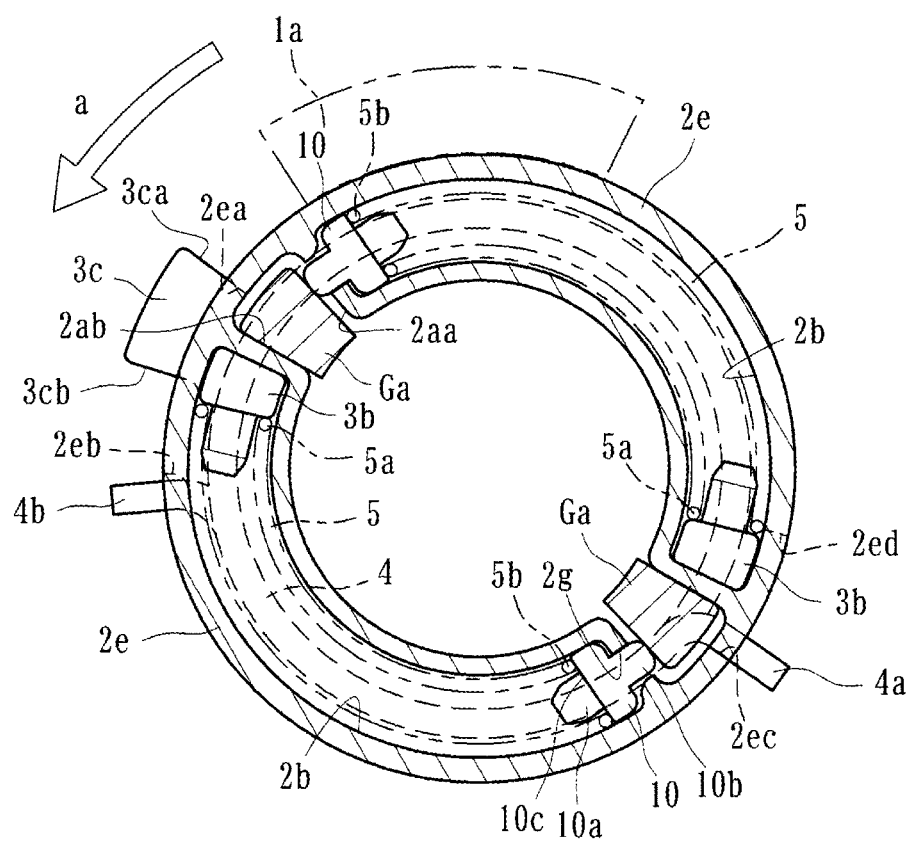
FIGS. 14A to 14C are explanatory diagrams showing the operation of the urging force applying unit of the throttle grip device, and are schematic views showing a state of the urging force applying and the interlocking member when the throttle grip is subjected to normal rotation.
Figure 14B:
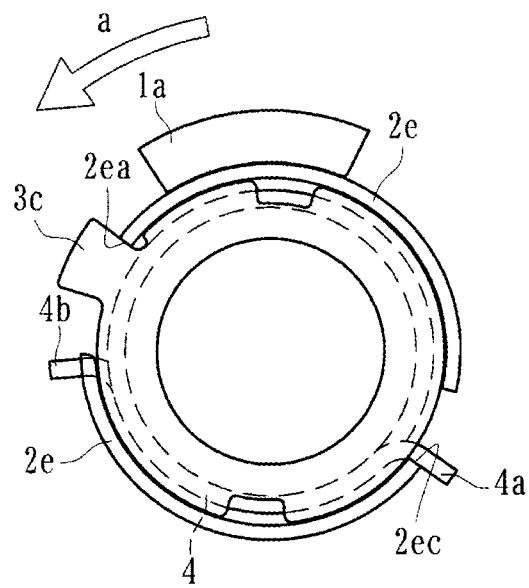
Figure 14C:
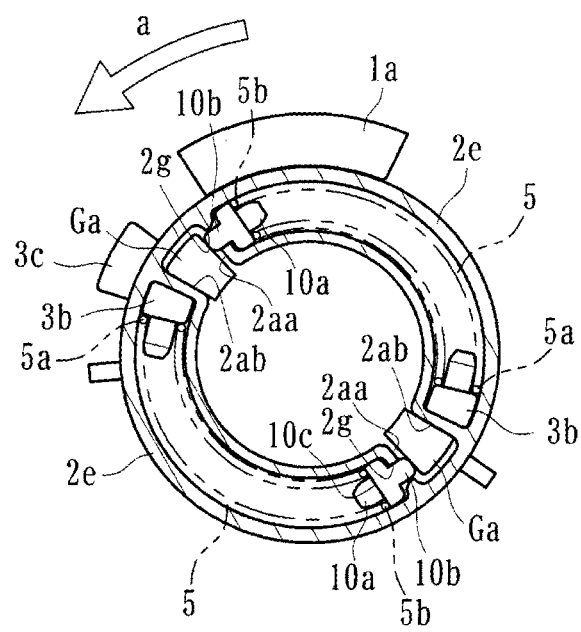
Figure 15A:
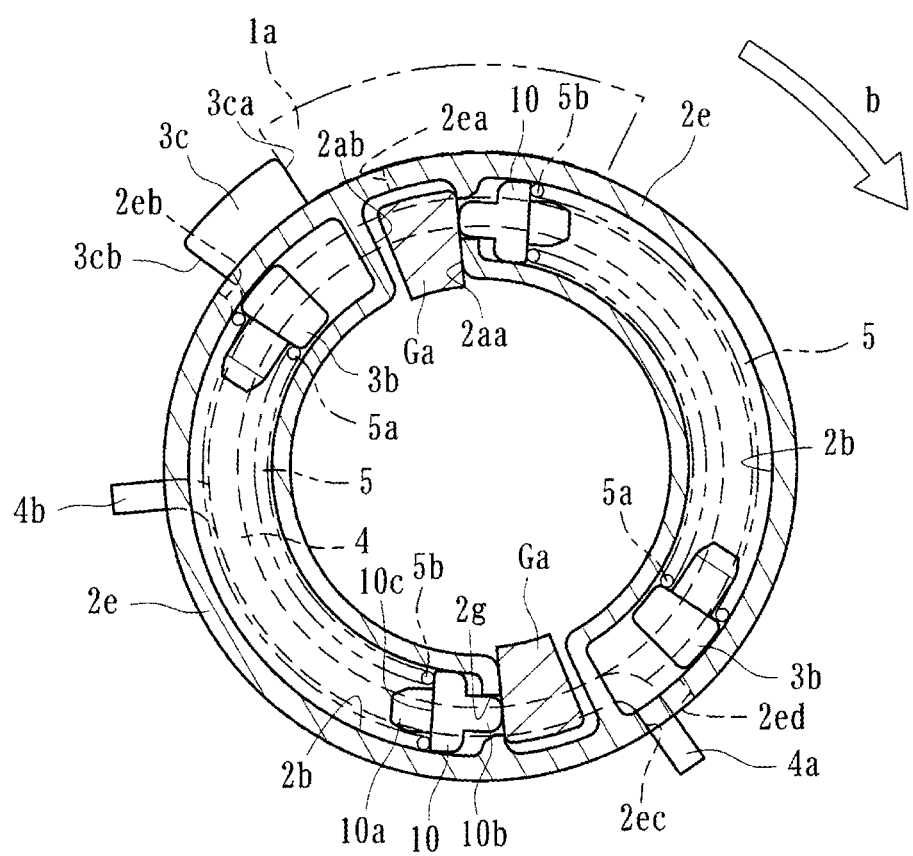
FIGS. 15A to 15C are explanatory diagrams showing the operation of the urging force applying unit of the throttle grip device, and are schematic views showing a state of the urging force applying unit and the interlocking member when the throttle grip is subjected to reversed rotation.
Figure 15B:
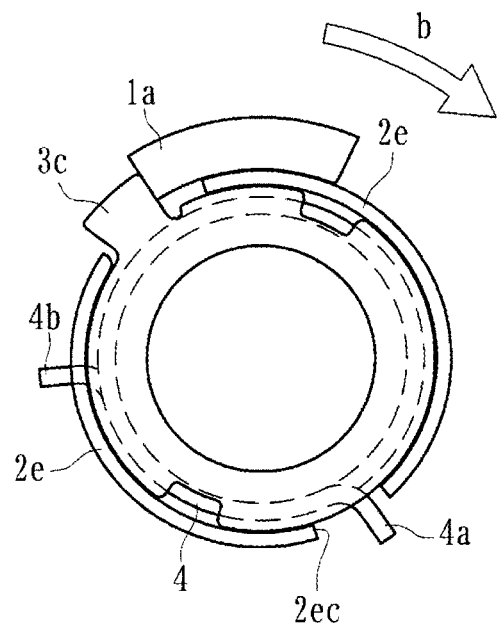
Figure 15C:
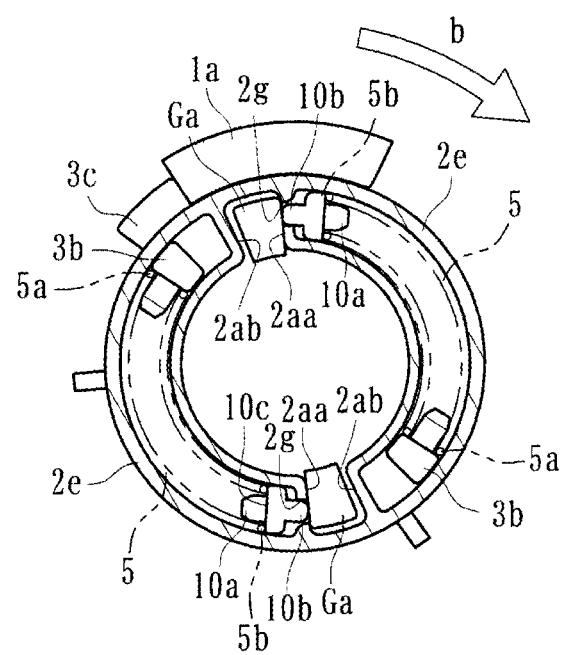

The abutting portion 3c which protrudes further in an outer diameter direction is formed on one of the pair of protruding portions 3a. In a state where the urging force applying unit 3 is assembled to the interlocking member 2, as shown in FIGS. 13A to 13C, the abutting portion 3c is located in a gap (between an end portion 2ea of one protruding portion 2e and an end portion 2eb of the other protruding portion 2e) where the pair of protruding portions 2e are formed. When the interlocking member 2 is subjected to the normal rotation a, as shown in FIGS. 14A to 14C, the end 2ea of the protruding portion 2e presses one end surface 3ca of the abutting portion 3c, and the urging force applying unit 3 is rotated together with the interlocking member 2. On the other hand, when the interlocking member 2 is subjected to the reversed rotation b, as shown in FIGS. 15A to 15C, the end portion 2eb of the other protruding portion 2e is rotated until the end portion 2eb is abutted against the other end surface 3cb of the abutting portion 3c, and the other end surface 3ca is not pressed until such abutting occurs, so that the urging force applying unit 3 is stopped while rotation of the interlocking member 2 is allowed.

Figure 7:
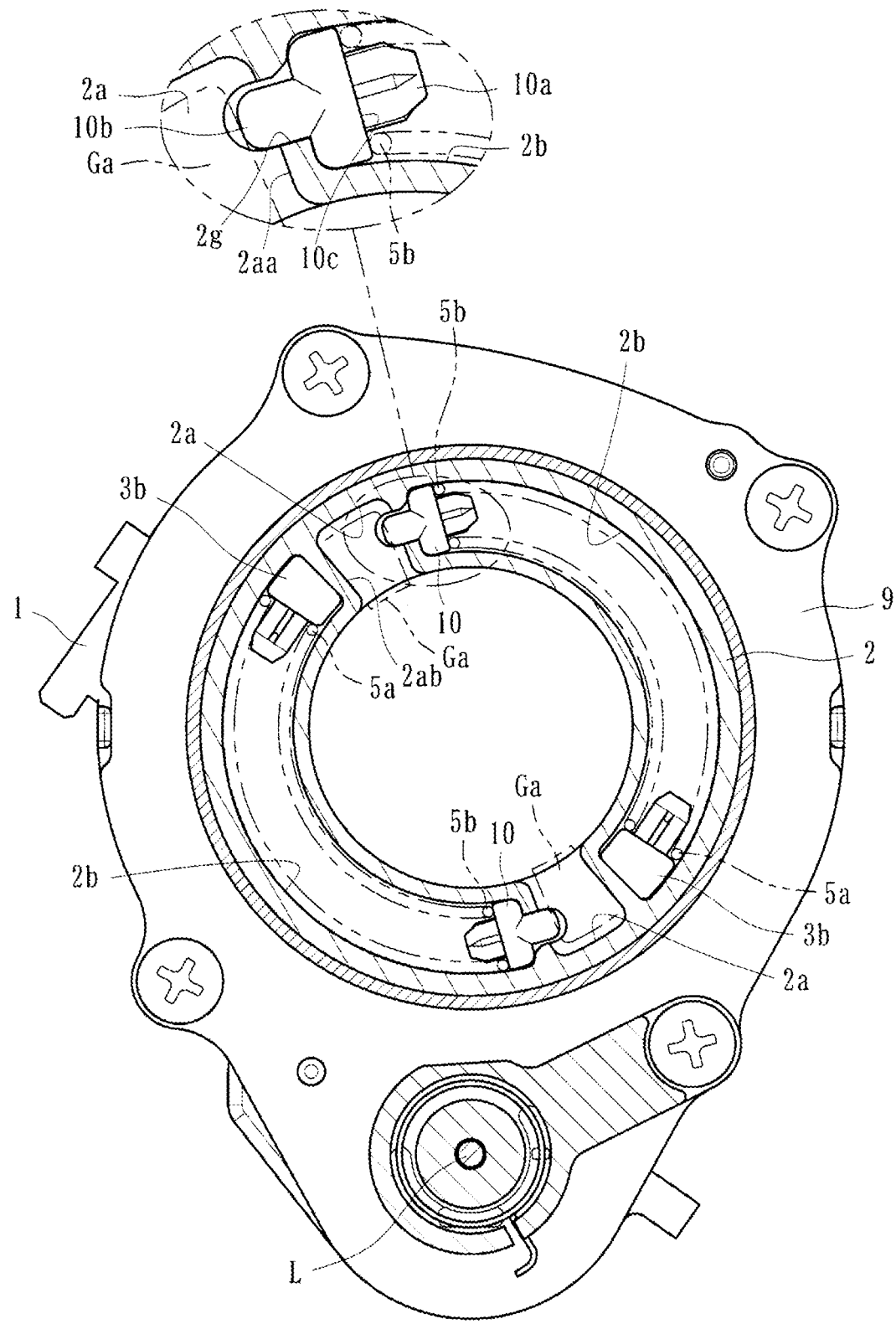
FIG. 7 is a cross-sectional view taken along line VII-VII of FIG. 6.

The spring receiver 3b is located in the accommodating portion 2b of the interlocking member 2 in a state where the urging force applying unit 3 is attached to the interlocking member 2, and can receive the side of one end 5a of the second urging unit 5 which is accommodated in the accommodating portion 2b as shown in FIG. 7. The one end 5a of the second urging unit 5 is supported by the spring receiver 3b while the side of the other end 5b is abutted against and assembled to a wall surface 10c of the pressing unit 10. When the interlocking member 2 and the urging force applying unit 3 rotate together (see FIGS. 14A to 14C), an urging force of the second urging unit 5 is not applied. When the urging force applying unit 3 is stopped while the interlocking member 2 rotates (see FIGS. 15A to 15C), the second urging unit 5 is compressed and the urging force is applied to the interlocking member 2.

Further, the abutting portion 3c is formed of a portion that is integrally formed to protrude toward a radial direction of the urging force applying unit 3. When the interlocking member 2 is subjected to the reversed rotation b, as shown in FIGS. 15A to 15C, the abutting portion 3c can abut against the stopper 1a formed in the case 1. As a result, even if the interlocking member 2 is subjected to the reversed rotation b and receives a reaction force due to the urging force of the second urging unit 5, the urging force applying unit 3 is maintained in a stopping state.

One end 4a of the first urging member 4 is locked by an end portion 2ec (see FIG. 10) of the protruding portion 2e formed on the interlocking member 2 while the other end 4b is locked by a locking groove 1b (see FIG. 8) formed in the case 1. When the interlocking member 2 is subjected to the normal rotation a and rotates together with the urging force applying unit 3, as shown in FIGS. 14A to 14C, the one end 4a is pressed against the end portion 2ec of the protruding portion 2e, and an urging force can be applied to the interlocking member 2 and the urging force applying unit 3. On the other hand, when the interlocking member 2 is subjected to the reversed rotation b, as shown in FIGS. 15A to 15C, the one end 4a of the first urging unit 4 is held in a state of being located between the protruding portions 2e (between an end portion 2ed of the one protruding portion 2e and the end portion 2ec of the other protruding portion 2e) without being pressed, and the urging force of the first urging unit 4 is not applied.

As described above, the urging force applying unit 3 according to the present embodiment is attached with the second urging unit 5. When the throttle grip G is subjected to the normal rotation a, the urging force applying unit 3 rotates together with the interlocking member 2, and the urging force of the second urging unit 5 is not applied to the interlocking member 2 (the urging force of the first urging unit 4 is applied). When the throttle grip G is subjected to the reversed rotation b, the urging force applying unit 3 is stopped due to the abutting between the stopper 1a formed in the case 1 and the abutting portion 3c while the rotation of the interlocking member 2 is allowed, and the urging force of the second urging unit 5 can be applied to the interlocking member 2 (the urging force of the first urging unit 4 is not applied). As a result, the urging force of the first urging unit 4 or the second urging unit 5 can be appropriately and reliably applied to the interlocking member 2 in accordance with the rotation direction of the throttle grip G.

Figure 12:
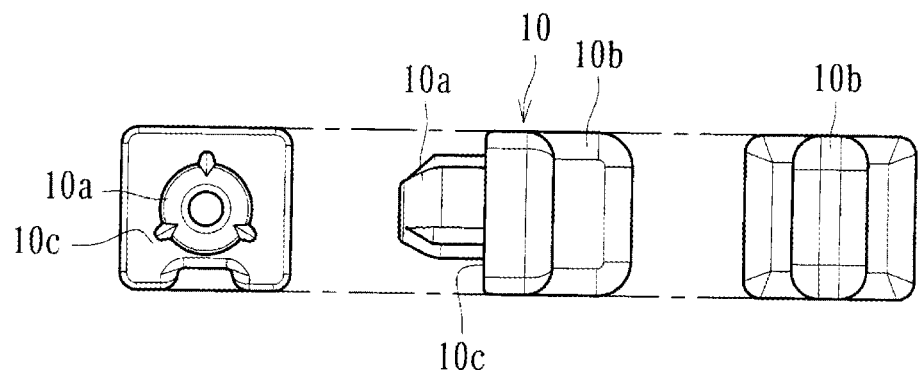
FIG. 12 is a three-sided view showing a pressing unit of the throttle grip device.

Here, in the present embodiment, the pressing unit 10, which can press the engaging portion Ga of the throttle grip G against the engaged portion 2a of the interlocking member 2 by the urging force of the second urging unit 5 when the throttle grip G is in the initial position, is provided. As shown in FIG. 12, the pressing unit 10 is formed of a shaft-shaped component in which a receiving portion 10a and the wall surface 10c, which receive the urging force of the second urging unit 5, and a contact portion 10b, which comes into contact with the engaging portion Ga of the throttle grip G to apply the urging force of the second urging unit 5 to the engaging portion Ga, are integrally formed.

However, as described above, the second urging unit 5 is formed of the coil spring extending in an arc shape at a position between the engaged portions 2a of the interlocking member 2, and the pressing unit 10 is attached to the end portion of the coil spring. As shown in FIG. 7, the receiving portion 10a is abutted against and assembled to the end portion (the other end portion) of the second urging unit 5, and the urging force of the second urging unit 5 is applied to the pressing unit 10.

A tip end of the contact portion 10b, which can come into contact with the engaging portion Ga, is formed of a spherical surface. The contact portion 10b is assembled in a state of being inserted into an opening 2g formed in the interlocking member 2. The opening 2g is formed of a hole communicating between a portion to which the second urging unit 5 is assembled and the engaged portion 2a, and is configured such that the urging force of the second urging unit 5 received by the receiving portion 10a and the wall surface 10c can be applied to the engaging portion Ga engaged with the engaged portion 2a via the contact portion 10b. The pressing unit 10 may also press the engaging portion Ga against a surface different from a wall surface 2ab.

The engaged portion 2a, as shown in FIGS. 7 and 13A to 13C, has a recessed shaped which includes: a wall surface 2aa where the opening 2g is formed; and the wall surface 2ab which faces the wall surface 2aa. The engaging portion Ga, which receives the urging force of the second urging unit 5 via the pressing unit 10, is pressed against the wall surface 2ab, so that rattling is not generated between the throttle grip G, which is in the initial position, and the interlocking member 2. In this way, in the pressing unit 10 according to the present embodiment, since the engaging portion Ga is pressed against the wall surface 2ab, the interlocking member 2 is pressed toward the rotation direction (the side of the noimal rotation a) to prevent rattling. In addition to prevention of the rattling of the throttle grip G located in the initial position, the engaging portion Ga can be positioned with respect to the engaged portion 2a.

When the throttle grip G is subjected to the normal rotation a from the initial position, as shown in FIGS. 14A to 14C, the engaging portion Ga presses the wall surface 2ab of the engaged portion 2a to rotate the interlocking member 2 in the same direction (the direction of the normal rotation a), and the contact between the contact portion 10b and the engaging portion Ga is maintained. Further, when the throttle G is subjected to the reversed rotation b from the initial position, as shown in FIGS. 15A to 15C, the engaging portion Ga moves the pressing unit 10 against the urging force of the second urging unit 5 to press the wall surface 2aa of the engaged portion 2a, thereby rotating the interlocking member 2 in the same direction (the direction of the reversed rotation b). At this time, the contact portion 10a is submerged in the opening 2g while the contact between the contact portion 10a and the engaging portion Ga is maintained.

Further, in the present embodiment, the second urging unit 5, which includes the pressing unit 10, is attached to the urging force applying unit 3. The urging force applying unit 3 is assembled to the interlocking member 2. As a result, it is not necessary to provide a special installation space for the pressing unit 10, and a space between the urging force applying unit 3 and the interlocking member 2 can be effectively used, so that a dead space can be prevented from being formed in the case 1.

Although there are two engaging portions Ga of the throttle grip G and two engaged portions 2a of the interlocking member 2 formed at equal intervals in the rotation direction of the throttle grip G in the present embodiment, for example, three or more may be formed, and the second urging unit 5 and the pressing unit 10 may be provided between the engaged portions 2a as long as a plurality of the engaging portions and engaged portions are formed at equal intervals in the rotation direction of the throttle grip G.

Since the urging force applying unit 3, which is capable of not applying the urging force of the second urging unit 5 to the interlocking member 2 when the throttle grip G is subjected to the normal rotation and applying the urging force of the second urging unit 5 to the interlocking member 2 when the throttle grip G is subjected to the reversed rotation, is provided, so that the first urging unit 4 and the second urging unit 5 can be selectively operated in accordance with the rotation direction of the throttle grip G. Therefore, the throttle grip G can be rotated more smoothly, and operability thereof can be further improved.

According to the present embodiment, since the pressing unit 10, which can press the engaging portion Ga against the engaged portion 2a by the urging force of the second urging unit 5 when the throttle grip G is in the initial position, is provided, the second urging unit 5 can serve both as an urging unit for generating an urging force when the throttle grip G is subjected to the reversed rotation and an urging unit for generating an urging force to prevent rattling, and rattling between the throttle grip G and the interlocking member 2 can be reduced without increasing the number of the urging units.

Since the pressing unit 10 according to the present embodiment includes the receiving portion 10a configured to receive the urging force of the second urging unit 5 and the contact portion 10b configured to come into contact with the engaging portion Ga of the throttle grip G to apply the urging force of the second urging unit 5 to the engaging portion Ga, the urging force for preventing the rattling can be reliably applied from the pressing unit 10 to the throttle grip G. Further, since the second urging unit 5 according to the present embodiment includes the coil spring extending in the arc shape at the position between the engaged portions 2a of the interlocking member 2, and since the pressing unit 10 is attached to the end portion of the coil spring, the urging force for preventing the rattling is generated in the rotation direction of the throttle grip G, so that the normal rotation and the reversed rotation of the throttle grip G can be stably performed.

Still further, since the urging force applying unit 3, which is capable of not applying the urging force of the second urging unit 5 to the interlocking member 2 when the throttle grip G is subjected to the normal rotation and applying the urging force of the second urging unit 5 to the interlocking member 2 when the throttle grip G is subjected to the reversed rotation, is provided, and since the second urging unit 5, which includes the pressing unit 10, is attached to the urging force applying unit 3, the urging force of the second urging unit 5 can be effectively applied to the throttle grip G.

Although the present embodiment has been described above, the present invention is not limited thereto, and for example, the first urging unit 4 may be an urging unit other than the torsion coil spring (another urging unit for urging the interlocking member 2 toward the initial position when the throttle grip G is subjected to the normal rotation), and the second urging unit 5 may be an urging unit other than the coil spring (another urging unit for urging the interlocking member 2 toward the initial position when the throttle grip G is subjected to the reversed rotation). Moreover, instead of the magnetic sensor 7, other sensors (such as a sensor not using magnetism) that can detect the rotation angle of the throttle grip G may also be used.

Further, although the constant vehicle speed holding control of the constant vehicle speed holding device (auto cruise device) is stopped (canceled) when the throttle grip G is subjected to the reversed rotation in the present embodiment, the present invention is sufficient as long as a predetermined function of the vehicle is activated or deactivated when rotation of the throttle grip Gin a reverse direction is detected. For example, the rotation of the throttle grip G in the reverse direction may start authentication of an immobilizer system or a smart entry system, activate a starter for starting an engine, activate a lighting unit during emergency such as hazard, and perform backward movement of a vehicle or the like. The vehicle to which the present invention is applied is not limited to a motorcycle as in the present embodiment, and the present invention may also be applied to other vehicles (for example, an ATV or a snowmobile) including the handlebar H thereon.

The present invention can be applied with different external shapes or with addition of other functions or the like as long as the invention is a throttle grip device includes the pressing unit which is capable of pressing the engaging portion against the engaged portion by the urging force of the second urging unit when the throttle grip is in the initial position.

According to an aspect of the invention, there is provided a throttle grip device comprising: a throttle grip which is rotatable by a driver, and which is capable of normal rotation in a predetermined direction from an initial position and reversed rotation in a direction opposite to the predetermined direction, an interlocking member which includes an engaged portion capable of being engaged with an engaging portion formed on the throttle grip, and which is capable of rotating in conjunction with the normal rotation and the reversed rotation of the throttle grip; a case which is configured to rotatably hold the interlocking member; a first urging unit which is configured to urge the interlocking member toward the initial position when the throttle grip is subjected to the normal rotation; a second urging unit which is configured to urge the interlocking member toward the initial position when the throttle grip is subjected to the reversed rotation; and a rotation angle detecting unit which is capable of detecting a rotation angle of the throttle grip by detecting a rotation angle of the interlocking member, wherein the throttle grip device is capable of controlling an engine of a vehicle in accordance with the rotation angle of the throttle grip detected by the rotation angle detecting unit when the throttle grip is subjected to the normal rotation, and is capable of activating or deactivating a predetermined function of the vehicle when the throttle grip is subjected to the reversed rotation, and wherein the throttle grip device further comprises: a pressing unit which is capable of pressing the engaging portion against the engaged portion by an urging force of the second urging unit when the throttle grip is in the initial position.

According to the above aspect of the invention, since the pressing unit, which can press the engaging portion against the engaged portion by the urging force of the second urging unit when the throttle grip is in the initial position, is provided, the second urging unit can serve both as an urging unit for generating an urging force when the throttle grip is subjected to the reversed rotation and an urging unit for generating an urging force to prevent rattling, and rattling between the throttle grip and the interlocking member can be reduced without increasing the number of the urging units.

The pressing unit may include: a receiving portion configured to receive the urging force of the second urging unit; and a contact portion configured to come into contact with the engaging portion of the throttle grip to apply the urging force of the second urging unit to the engaging portion.

According to the above aspect of the invention, since the pressing unit includes the receiving portion configured to receive the urging force of the second urging unit and the contact portion configured to come into contact with the engaging portion of the throttle grip to apply the urging force of the second urging unit to the engaging portion, the urging force for preventing the rattling can be reliably applied from the pressing unit to the throttle grip.

The engaged portion of the interlocking member may include a pair of engaged portions, the second urging unit may include a coil spring extending in an arc shape at a position between the engaged portions, and the pressing unit may be attached to an end portion of the coil spring.

According to the above aspect of the invention, since the second urging unit includes the coil spring extending in the arc shape at the position between the engaged portions of the interlocking member, and since the pressing unit is attached to the end portion of the coil spring, the urging force for preventing the rattling is generated in a rotation direction of the throttle grip, so that the normal rotation and the reversed rotation of the throttle grip can be stably performed.

The throttle grip device may further comprise: an urging force applying unit which is capable of not applying the urging force of the second urging unit to the interlocking member when the throttle grip is subjected to the normal rotation and applying the urging force of the second urging unit to the interlocking member when the throttle grip is subjected to the reversed rotation, and the second urging unit, which includes the pressing unit, is attached to the urging force applying unit.

According to the above aspect of the present invention, since the urging force applying unit, which is capable of not applying the urging force of the second urging unit to the interlocking member when the throttle grip is subjected to the normal rotation and applying the urging force of the second urging unit to the interlocking member when the throttle grip is subjected to the reversed rotation, is provided, and since the second urging unit, which includes the pressing unit, is attached to the urging force applying unit, the urging force of the second urging unit can be effectively applied to the throttle grip.

What is claimed is:

1. A throttle grip device comprising:
a throttle grip which is rotatable by a driver, and which is capable of normal rotation in a predetermined direction from an initial position and reversed rotation in a direction opposite to the predetermined direction;
an interlocking member which includes an engaged portion capable of being engaged with an engaging portion formed on the throttle grip, and which is capable of rotating in conjunction with the normal rotation and the reversed rotation of the throttle grip;
a case which is configured to rotatably hold the interlocking member;
a first urging unit which is configured to urge the interlocking member toward the initial position when the throttle grip is subjected to the normal rotation;
a second urging unit which is configured to urge the interlocking member toward the initial position when the throttle grip is subjected to the reversed rotation; and
a rotation angle detecting unit which is capable of detecting a rotation angle of the throttle grip by detecting a rotation angle of the interlocking member,
wherein the throttle grip device is capable of controlling an engine of a vehicle in accordance with the rotation angle of the throttle grip detected by the rotation angle detecting unit when the throttle grip is subjected to the normal rotation, and is capable of activating or deactivating a predetermined function of the vehicle when the throttle grip is subjected to the reversed rotation, and
wherein the throttle grip device further comprises: a pressing unit which is capable of pressing the engaging portion against the engaged portion by an urging force of the second urging unit when the throttle grip is in the initial position.

2. The throttle grip device according to claim 1, wherein the pressing unit includes: a receiving portion configured to receive the urging force of the second urging unit; and a contact portion configured to come into contact with the engaging portion of the throttle grip to apply the urging force of the second urging unit to the engaging portion.

3. The throttle grip device according to claim 2, wherein the engaged portion of the interlocking member includes a pair of engaged portions,
the second urging unit includes a coil spring extending in an arc shape at a position between the engaged portions, and
the pressing unit is attached to an end portion of the coil spring.

4. The throttle grip device according to claim 1, further comprising: an urging force applying unit which is capable of not applying the urging force of the second urging unit to the interlocking member when the throttle grip is subjected to the normal rotation and applying the urging force of the second urging unit to the interlocking member when the throttle grip is subjected to the reversed rotation, wherein the second urging unit, which includes the pressing unit, is attached to the urging force applying unit.

* * * * *